(12) United States Patent
Rhoades et al.

(10) Patent No.: US 9,387,402 B2
(45) Date of Patent: Jul. 12, 2016

(54) METHOD AND SYSTEM FOR CONVERTING A COMPUTER VIRTUAL ENVIRONMENT INTO A REAL-LIFE SIMULATION ENVIRONMENT

(75) Inventors: Joshua Rhoades, West Hills, CA (US); Jeffrey Voris, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1896 days.

(21) Appl. No.: 11/901,780

(22) Filed: Sep. 18, 2007

(65) Prior Publication Data

US 2009/0076791 A1 Mar. 19, 2009

(51) Int. Cl.
| | | |
|---|---|---|
| G06G 7/48 | (2006.01) | |
| A63F 9/24 | (2006.01) | |
| A63F 13/00 | (2014.01) | |
| G06F 17/00 | (2006.01) | |
| G06F 19/00 | (2011.01) | |
| A63F 13/30 | (2014.01) | |
| A63F 13/40 | (2014.01) | |

(52) U.S. Cl.
CPC .................. *A63F 13/12* (2013.01); *A63F 13/10* (2013.01)

(58) Field of Classification Search
USPC ........ 703/1, 6–8; 426/59; 434/29; 463/31, 42
See application file for complete search history.

(56) References Cited

U.S. PATENT DOCUMENTS

| | | | | |
|---|---|---|---|---|
| 5,474,453 A | | 12/1995 | Copperman | |
| 5,669,821 A | * | 9/1997 | Prather et al. | 472/59 |
| 6,007,338 A | * | 12/1999 | DiNunzio et al. | 434/55 |
| 6,079,982 A | * | 6/2000 | Meader | 434/29 |
| 6,179,619 B1 | * | 1/2001 | Tanaka | 434/69 |
| 7,104,889 B2 | * | 9/2006 | Nelson et al. | 463/25 |
| 7,670,220 B2 | * | 3/2010 | Chudley et al. | 463/6 |
| 7,955,168 B2 | * | 6/2011 | Mendelsohn et al. | 463/2 |
| 2007/0121957 A1 | | 5/2007 | Trowbridge | |

FOREIGN PATENT DOCUMENTS

| | | |
|---|---|---|
| WO | WO 95/27543 | 10/1995 |
| WO | WO 99/34344 | 7/1999 |

* cited by examiner

*Primary Examiner* — Aniss Chad
(74) *Attorney, Agent, or Firm* — Farjami & Farjami LLP

(57) ABSTRACT

There is provided a method for converting a computer game into a real-life simulation environment comprising receiving metadata defining virtual features and a virtual layout, matching the virtual features to simulation features of the real-life simulation environment, mapping the virtual layout onto the real-life simulation environment, and compiling those results as data corresponding to a real-life simulation of the computer game. A converter configured to translate a computer virtual environment into a real-life simulation environment comprises an input module configured to receive metadata, a memory including a simulation database containing simulation features of the real-life simulation environment, a synchronization module configured to match virtual features to the simulation features, a mapping module configured to map the virtual layout onto the real-life simulation environment, and a controller configured to compile the simulation features and the real-life simulation environment into a real-life simulation of the computer virtual environment.

18 Claims, 4 Drawing Sheets

METHOD AND SYSTEM FOR CONVERTING A COMPUTER VIRTUAL ENVIRONMENT INTO A REAL-LIFE SIMULATION ENVIRONMENT

BACKGROUND OF THE INVENTION

1. Field of the Invention

The present invention relates to computer-enhanced entertainment. More particularly, the present invention relates to utilizing a computer virtual environment for production of a real-life simulation environment.

2. Background Art

Theme parks and fairgrounds have been traditional venues for the more adventurous among us to experience the excitement of a thrill ride, or to test our physical prowess in a game of skill. With advances in technology, those rides and games have evolved considerably from the comparatively simple midway Ferris wheel or arcade shooting gallery of the past. It is no longer unusual for a visitor of a modern theme park, for example, to encounter sophisticated real-life simulation rides or gaming attractions that are so realistic as to create virtual reality experiences for their users.

Because of their emphasis on verisimilitude, rides and games offering real-life simulation environments may be heavily reliant on costly and complex supporting technologies requiring extensive synchronization and substantial information processing capabilities. As a result, those attractions are likely to be time consuming and expensive to develop, making their implementation a protracted process. For such reasons, new rides and games utilizing real-life simulations tend to be infrequently introduced, while those already in service may be operated over a span of years, or even decades, in order to make their implementation economically practicable. Consequently, these sophisticated attractions may not be responsive to rapidly changing user tastes and preferences.

A recent competitor for the attention of the mostly young and technologically savvy public to whom realistic game or ride simulations may primarily appeal, are computer virtual environments, accessible over the Internet, for example. Computer based games and simulations utilize computer graphics applications to mimic a three-dimensional real-life environment, using the two-dimensional presentation available through a computer monitor or mobile device display screen. Because, from the standpoint of the provider of these forms of entertainment, the computer supported environments are software based, rather than requiring the combination of software, hardware, and mechanical devices needed to support a theme park game or ride, for example, they are considerably less costly to make available. As a result, there are a greater variety of computer virtual environments from which to choose, and a more frequent rate of introduction of new or varied computer entertainment based on those environments, than are found in the theme park attraction context.

An additional advantage of computer games or simulations over their theme park counterparts is the extent to which a user can modify the parameters of the computer virtual environment to conform to their own preferences. For example, while a conventional real-life simulation ride, such as Disneyland's Space Mountain or Indiana Jones Adventure, is substantially the same experience for all riders, a computer game environment might be customizable by its user. A computer game may invite a player to interactively generate the gaming environment by selecting game characteristics. A user may be prompted to define the type of environment in which the game or simulation will occur, for example, in a jungle setting, or in outer space. The user may further determine the types of icons used, the events for which game points are to be awarded, and point valuations for alternative actions, for instance. As a result, a computer game or simulation customized as described may seem more personal, is almost certainly more responsive to user preferences, and is more flexible in the face of changes in those preferences, than are most theme park attractions.

Despite providing visually complex entertainment and being more flexible and responsive to user tastes than theme park attractions, however, computer virtual environments are inevitably constrained by their format. Consequently, they fail to provide the visceral thrill associated with a real-life simulation experience, which might include physical motion, for example. As a result, the conventional state of the art is such that a prospective user of a game or simulation may be faced with a mutually exclusive choice. On the one hand, he or she can relinquish realism in favor of the flexibility and variety available through a computer virtual environment. Alternatively, he or she can choose to enjoy the realism available from a sophisticated real-life simulation environment, but must assume the role of a passive consumer to derive that sensory benefit.

Thus, although both of the conventional approaches for implementing gaming and simulation environments described previously may be seen to embody desirable aspects, neither optimally satisfies consumer demands for an entertainment product that concurrently possesses sensory richness and customizability. Accordingly, there is a need to overcome the drawbacks and deficiencies in the art by providing an entertainment environment having the realism of a real-life simulation, as well as the flexibility and responsiveness to user preferences characteristic of a simulation relying on a computer virtual environment.

SUMMARY OF THE INVENTION

A method and system for converting a computer virtual environment into a real-life simulation environment, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
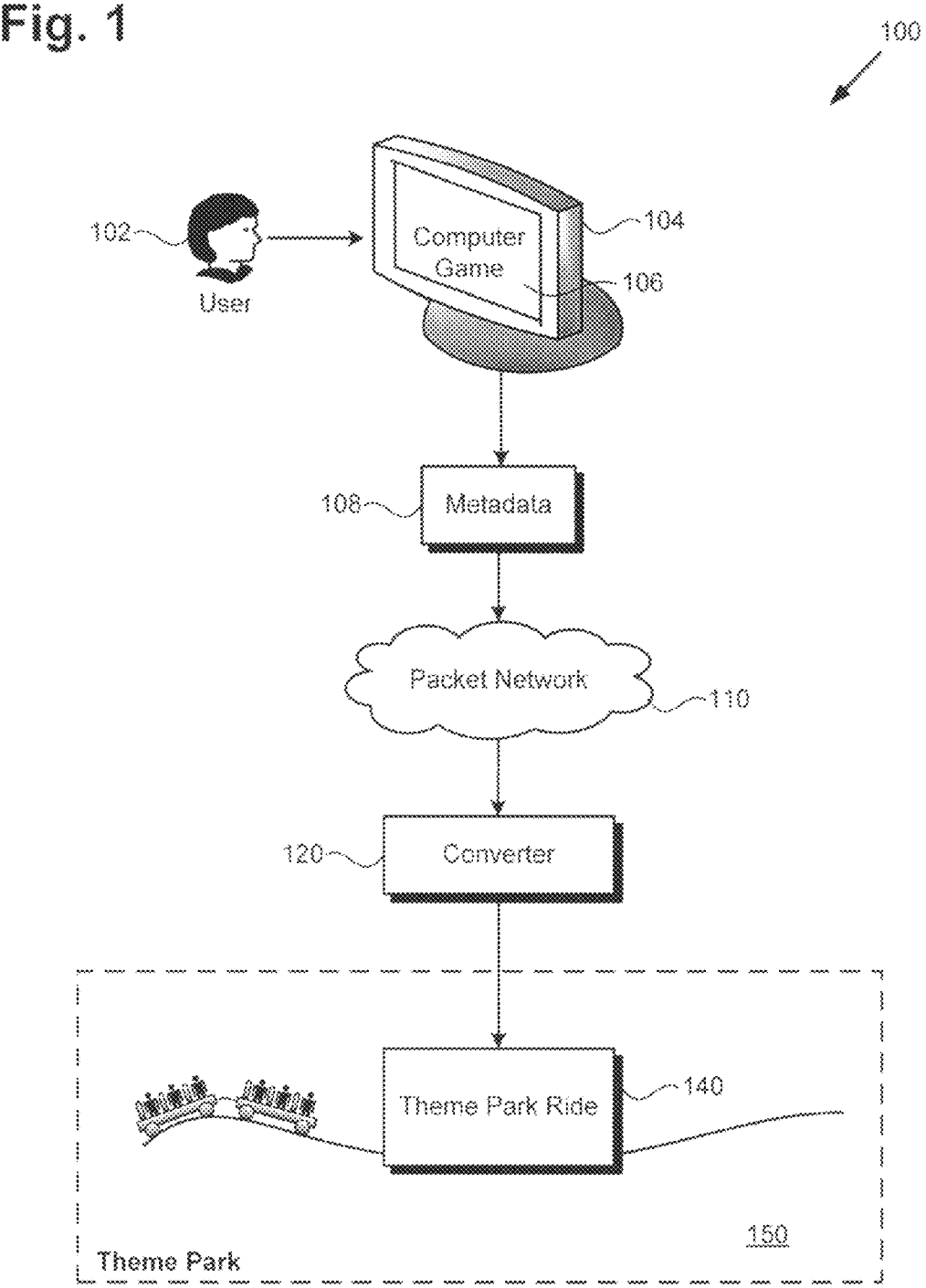
FIG. 1 is a diagram showing an exemplary implementation of a process for converting a computer virtual environment into a real-life simulation environment, according to one embodiment of the present invention.

The present application is directed to a method and system for converting a computer virtual environment into a real-life simulation environment. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a diagram showing an exemplary implementation of a process for converting a computer virtual environment into a real-life simulation environment, according to one embodiment of the present invention. FIG. 1 includes user 102 utilizing computer 104 to input parameters to a computer application (not shown) running on computer 104. The computer application supports a computer game displayed on monitor 106, and allows user 102 to define features and a layout for the computer game. In the present embodiment, metadata 108 coded into the computer application and comprising the virtual features and virtual layout of the computer game defined by user 102, is communicated to converter 120, through packet network 110. Converter 120 receives metadata 108 and translates the virtual features and virtual layout of the computer virtual environment into a real-life simulation environment suitable for use by theme park ride 140, offered as an attraction in theme park 150.

As shown in diagram 100 of FIG. 1, an embodiment of the present invention is directed to a method and system that supports the collection of metadata corresponding to customized features and a layout defined by user 102, in a computer virtual environment, and enables implementation of that scheme as a real-life simulation environment as part of theme park ride 140. As a result of the conversion performed by converter 120, the disclosed embodiment makes it possible for user 102 not only to customize a computer game by defining a computer virtual environment, but also to subsequently enjoy the full sensory experience of a real-life simulation of that customized virtual environment, through subsequent use of theme park ride 140.

With reference to the embodiment of FIG. 1, the Disneyland Space Mountain may be used an example of a real-life simulation environment. The Disneyland Space Mountain is a roller coaster ride provided within a simulation environment in which the rider is surrounded by audio and visual cues creating the sensation that he or she is traveling through interstellar space. According to the present embodiment, updates or variations in the sensory stimuli provided during the Space Mountain ride could be varied by metadata and information created on computer 104 by user 102.

For instance, the computer application running on computer 104 might invite user 102 to specify parameters for a target acquisition type game. In response, user 102 might select an outer space environment comprising an onrushing asteroid field, and choose various types of asteroids or planetoids as targets. User 102 may further assign point values to the selected targets based on their size, approach speed, and distance, for example, thereby defining virtual features and a virtual layout for the asteroid game. Metadata 108 encoding the virtual features and layout can then be received by converter 120, for conversion of the computer virtual environment corresponding to the asteroid game, to the real-life simulation environment of the Space Mountain ride.

Metadata 108 might comprise metatags indicating that the "background", for example, is a star field, and that the "foreground" is an approaching asteroid field. A selected "first target" might be an asteroid of a particular size and having a particular approach speed. Destruction of a first target might result in a "first target hit" resulting in display of an exploding asteroid, for example, and be associated with the "first target sound" of an explosion. Firing an asteroid gun might be associated with the visual feature of a tracer shot, for example, and an audio cue that a shot has been fired.

As a result of conversion of metadata 108 by converter 120, data corresponding to a version of the asteroid game suitable for use on the Space Mountain ride is provided to theme park ride 140. The converted real-life simulation environment might correspond to a rollercoaster ride segment. For instance, a slowdown segment of the ride, in which rider carriages are decelerating after completing a final rapid descent, might be enlivened by an introduction warning riders of an impending asteroid field and inviting them to protect their space vehicle by destroying the offending objects. Thus, during the final twenty seconds of a three-minute ride, for example, video screens bordering the ride would display images of approaching asteroids, together with appropriate audio accompaniment. Riders could use a joystick provided adjacent to their seat, and activated along with the asteroid game ride segment, to fire at approaching asteroids, producing corresponding images of tracer shots and sounds of firing. Other ride segments could be similarly updated or varied by conversion of other customized computer games utilizing outer space environments. In that way, the formerly unvarying real-life simulation environment of a theme park ride can be made more dynamically responsive to changes in rider preferences, thereby assuming some of the customizability of a computer game.

Figure 2:
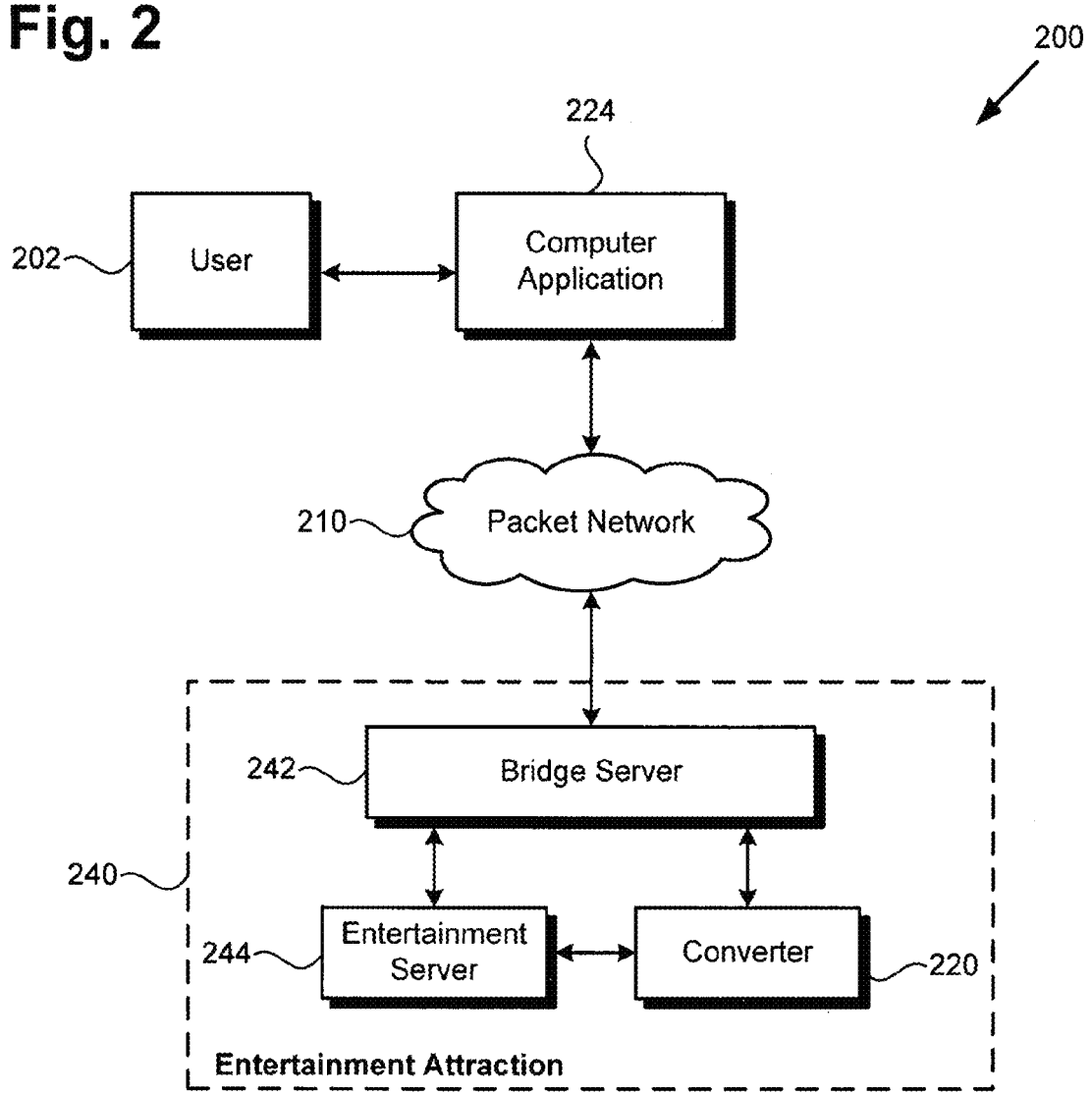
FIG. 2 shows a diagram of an exemplary communication network, including a system for converting a computer virtual environment into a real-life simulation environment, according to one embodiment of the present invention.

FIG. 2 shows a diagram of an exemplary communication network, including a system for converting a computer virtual environment into a real-life simulation environment, according to one embodiment of the present invention. Network 200 includes user 202, computer application 224, packet network 210 and entertainment attraction 240. Also shown in FIG. 2 are bridge server 242, entertainment server 244, and converter 220, situated within entertainment attraction 240. User 202, packet network 210, and converter 220 correspond respectively to user 102, packet network 120, and converter 220, in FIG. 1. Further, computer application 224 corresponds to the computer application being run on computer 104, in FIG. 1, while entertainment attraction 240 is analogous to theme park ride 140 in the previous figure.

In network 200 of FIG. 2, user 202 accesses computer application 224, comprising a customizable graphics program (not shown) enabling user 202 to determine a computer virtual environment, including virtual features and a virtual layout. Computer application 224 may be a computer game, or other computer simulation based entertainment, for example. Computer application 224 may invite user 202 to select a game environment, such as a mountain or jungle environment, for example, or an underwater environment. Computer application 224 may further invite user 102 to select features of the game, and establish a correspondence between game events and the awarding of game points. As another example, user 202 may utilize computer application 224 to create an underwater shark hunting game by specifying an undersea environment, selecting various shark species as game targets, and assigning game points for capturing each species.

User 202 may access computer application 224 using a personal computer, as shown in FIG. 1, or using a gaming console at a video arcade, for example. Computer application 224 may be a web application, accessible over a packet network, such as the Internet. Alternatively, computer application 224 may reside on a server supporting a local area network, in the video arcade context, for example, or included in another type of limited distribution network. Computer application 224 utilizes metadata to define and generate the virtual features and virtual layout selected or designed by user 202 in customizing the computer virtual environment.

As shown in FIG. 2, computer application 224 is in communication with converter 220 through packet network 210 and bridge server 242. As a result, converter 220 is able to receive metadata defining the virtual features and virtual layout defined by user 202 in customizing the computer virtual environment enabled by computer application 224. Although in the present embodiment converter 220 is shown to reside within entertainment attraction 240, in another embodiment converter 220 is located outside of entertainment attraction 240, and communicates with entertainment server 244 through bridge server 242. Furthermore, although in the present embodiment computer application 224 is shown communicating with bridge server 242 and converter 220 via packet network 210, in other embodiments computer application 224 may communicate directly with either bridge server 242 or converter 220 through a wired or wireless communication link.

Continuing with the embodiment of FIG. 2, after receiving metadata defining virtual features and a virtual layout of a computer virtual environment from computer application 224, converter 220 is configured to translate those features and map that layout into simulation features and a real-life simulation environment supported by entertainment server 244 and provided as entertainment attraction 240. To continue with the example of the shark hunting game introduced previously, converter 220 may be utilized to produce a real-life simulation of an undersea environment in which a rider on a theme park ride, i.e., entertainment attraction 240, can capture sharks identified by user 202 and score game points according to the point scheme defined using computer application 224. Thus, converter 220 enables implementation of a computer virtual environment defined by user 202 as a real-life simulation environment, such as a three-dimensional environment, presented by entertainment attraction 240.

Figure 3:
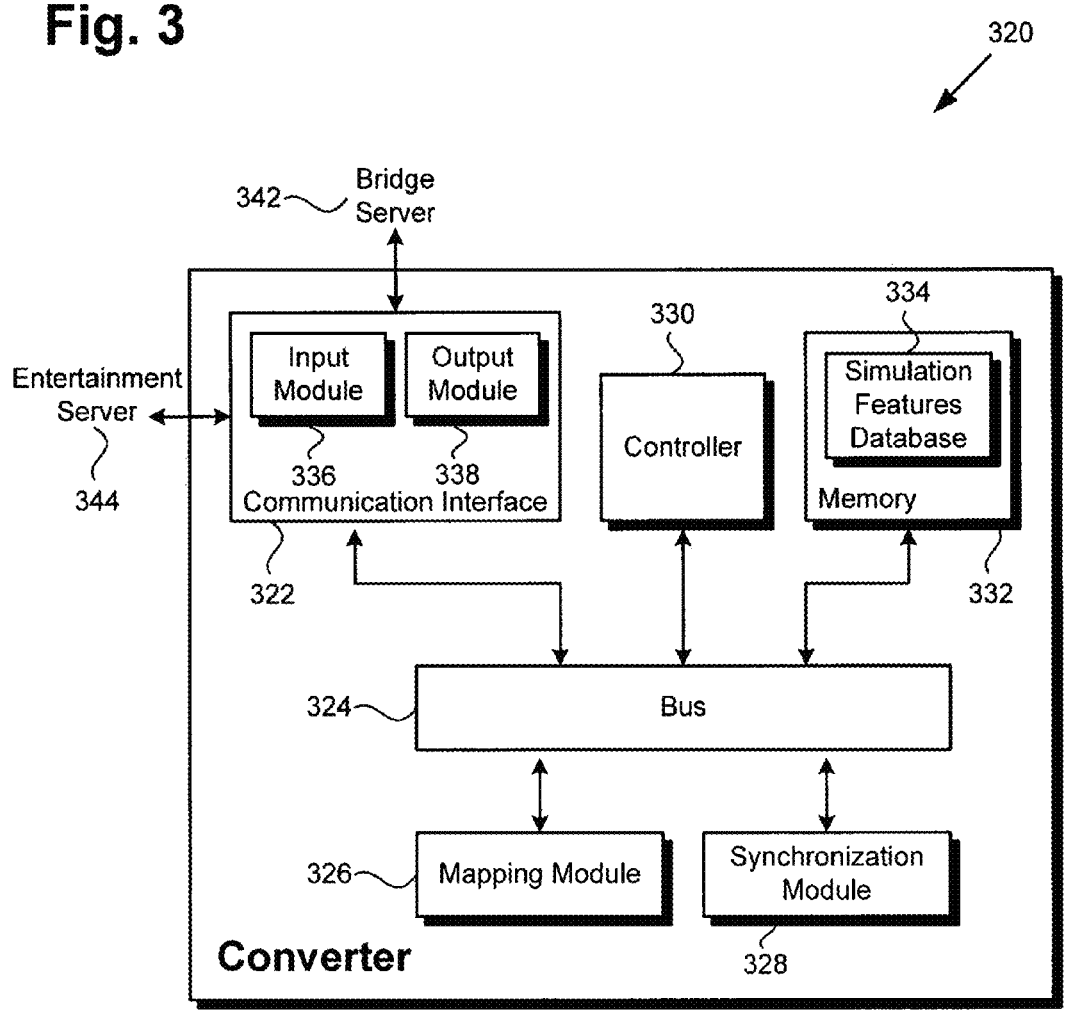
FIG. 3 shows a converter for use in the system in FIG. 2, according to one embodiment of the present invention.

Turning now to FIG. 3, it shows converter 320 for use in the system in FIG. 2, according to one embodiment of the present invention. Converter 320 in FIG. 3 corresponds to converter 220 in FIG. 2. As can be seen form FIG. 3, converter 320 is in communication with bridge server 342 and entertainment server 344 (neither of which is shown in FIG. 3), corresponding respectively to bridge server 242 and entertainment server 244 in FIG. 2. Converter 320 comprises communication interface 322, bus 324, mapping module 326, synchronization module 328, controller 330, and memory 332. Also shown in FIG. 3 are communication interface components input module 336 and output module 338, and simulation features database 334 located in memory 332.

Metadata received by converter 320 through input module 336 is translated or converted by means of synchronization module 328 and mapping module 326, in conjunction with controller 330 and simulation features database 334. The received metadata includes virtual features specified by user 202 in FIG. 2. Those virtual features are matched to available simulation features stored in simulation features database 334, by synchronization module 328, which thereby synchronizes real-life simulation features with the virtual features contained in the received metadata. The metadata also includes a virtual layout, which is mapped onto a real-life simulation layout by mapping module 326. Controller 330 is suitably configured to utilize the mapped layout and synchronized features to compile a real-life simulation environment for delivery to entertainment server 344, through output module 328.

Converter 320 may also receive the results of validation testing, performed by entertainment server 344, for example, on the real-life simulation environment provided. Converter 320 can receive a validation outcome through communication interface 322. Converter 320 may then act on the validation outcome in several ways. In one embodiment, converter 320 logs the validation outcome in memory 332, or an alternative internal or external registry. In one embodiment, converter 320 reports the validation outcome to computer application 224, in FIG. 2. In an alternative embodiment, converter 320 is further configured to respond to an error message included in a validation outcome by appropriate modification of the real-life simulation environment.

Figure 4:
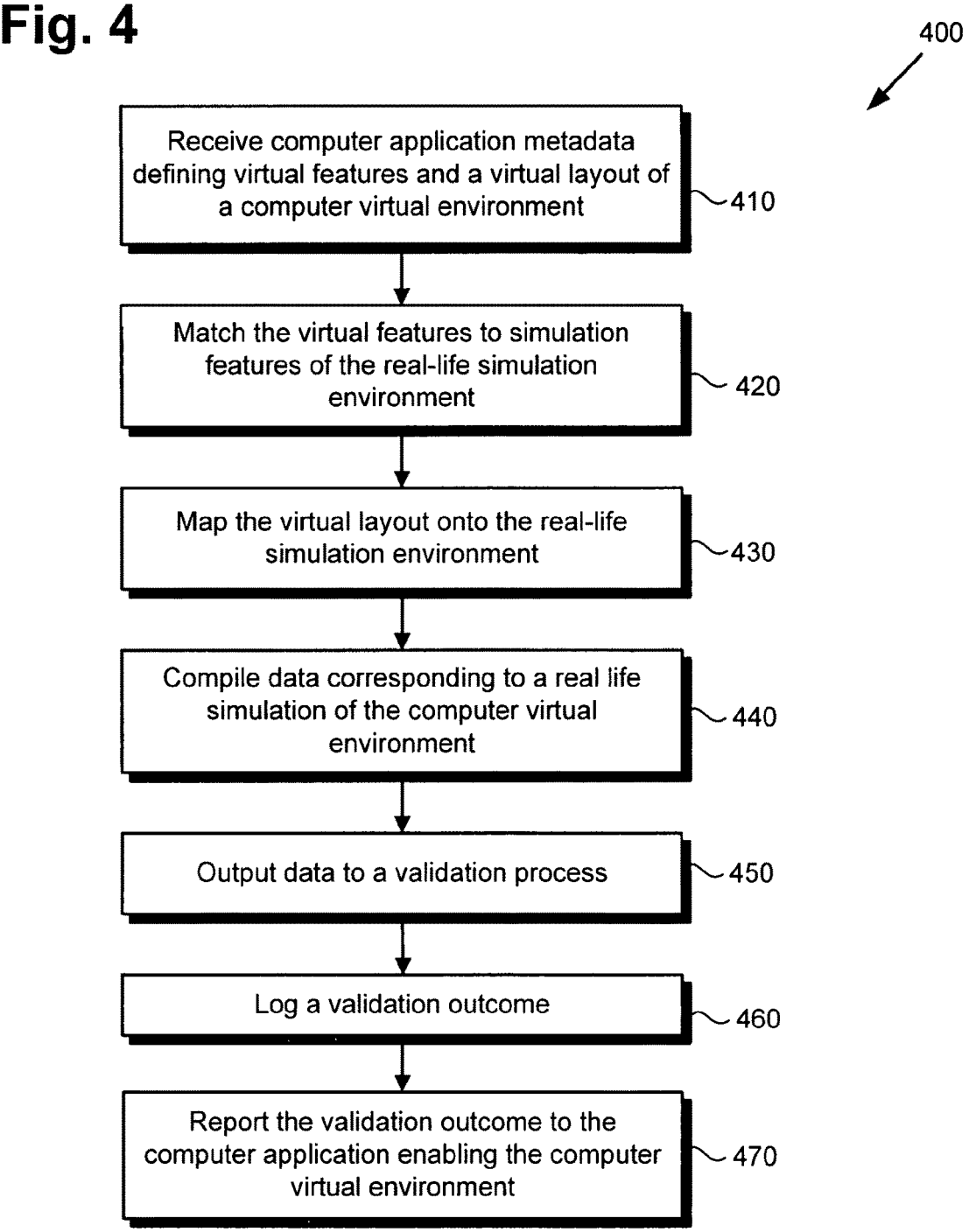
FIG. 4 is a flowchart presenting an exemplary method for use in the system in FIG. 2, according to one embodiment of the present invention.

The operation of converter 320 is now described in conjunction with FIG. 4, which presents an exemplary method for use in the system in FIG. 2, according to one embodiment of the present invention. Certain details and features have been left out of flowchart 400, in FIG. 4, which are apparent to a person of ordinary skill in the art. For example, a step may consist of one or more substeps or may involve specialized equipment or materials, as known in the art. While steps 410 through 470 indicated in flowchart 400 are sufficient to describe one embodiment of the present method, other embodiments may utilize steps different from those shown in flowchart 400, or may include more, or fewer steps.

Continuing with step 410 in FIG. 4 and converter 320 in FIG. 3, step 410 of flowchart 400 comprises receiving computer application metadata defining virtual features and a virtual layout of a computer virtual environment. As described previously, the metadata may be produced by a computer application enabling the computer virtual environment, such as a computer application supporting a customizable computer game. The metadata may be generated in response to an input defining virtual features and a virtual layout of the computer virtual environment, and may be received through input module 336.

The exemplary method of flowchart 400 continues with step 420, which comprises matching the virtual features contained in the metadata received in step 410 with features of the real-life simulation environment. Step 420 may be performed by synchronization module 328 working in conjunction with simulation feature database 334 located in memory 332. Synchronization module functions to replicate the virtual features defined in a computer virtual environment, by selecting from among simulation features contained in simulation features database 334, those which are most closely corresponding, according to selection criteria that may be pre-determined during configuration of synchronization module 328.

Flowchart 400 continues with step 430, comprising mapping the virtual layout contained in the metadata received in step 410. Step 430 may be performed by mapping module 326. For example, mapping module 326 may be configured to project a two-dimensional graphical environment encoded in the received metadata onto a three-dimensional simulation space, in order to reproduce the computer virtual layout as a real-life simulation environment. It is noted that although in the present embodiment step 430 follows step 420, in another embodiment their order may be reversed, while in yet another embodiment, steps 420 and 430 may occur substantially concurrently.

Step 440 of flowchart 400 comprises compiling data corresponding to a real-life simulation environment. In the embodiment of FIG. 3, for example, controller 330 is configured to compile the simulation features matched by synchronization module 328 in step 420 and the real-life simulation environment mapped by mapping module 326 in step 430 into a real-life simulation of the computer virtual environment provided as metadata at input module 336.

Continuing with step 450, step 450 comprises outputting the data compiled in step 440 to a validation process. The validation process may be an automated process internal to entertainment server 244, in FIG. 2, for example, to confirm compatibility of the real-life simulation environment with other features of entertainment attraction 240. Alternatively, in one embodiment, the output may be provided to a test process in which one or more human testers may implement the real-life simulation environment and confirm its suitability for inclusion in entertainment attraction 240.

Subsequent step 460 comprises logging a validation outcome. The outcome may comprise as little as a pass or fail outcome from an automated validation procedure. In one embodiment, however, the validation outcome may by more detailed, including an itemized list of outcomes for each simulation feature or mapped layout element, for example. In one embodiment, logging the validation outcome may simply comprise entering the validation outcome in a system registry. In other embodiments, however, logging the validation outcome may include the performance of corrective actions by converter 320, such as re-matching specific features or re-mapping elements of the layout, for example. Logging of the validation outcome is followed, in step 470, by reporting the outcome to the computer application from which the computer virtual environment metadata was received.

Thus, the user preferences entered as inputs to a customizable computer application can be used to present a real-life simulation, by means of a method and system for converting a computer virtual environment into a real-life simulation environment. According to various embodiments of the present invention, it is possible to advantageously provide an entertainment experience that concurrently offers the full sensory realism of a real-life simulation and a degree of responsive customizability heretofore absent from those attractions.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for converting a computer game environment of a computer game running on a computer into a real-life simulation environment, the method comprising:
receiving metadata produced by a computer application useable in conjunction with the computer game, the metadata generated in response to an input from a user of the computer game defining virtual features and a virtual layout of the computer game to customize the computer game environment for playing on the computer;
matching the virtual features of the computer game environment to simulation features of the real-life simulation environment, the real-life simulation environment including a simulation space and a vehicle designed to move through the simulation space, the simulation space being outer to the vehicle;
mapping the virtual layout of the computer game environment onto the simulation space outer to the vehicle;
compiling the simulation features and results of the mapping to produce data for the real-life simulation environment corresponding to the computer game environment; and
configuring the real-life simulation environment, including the simulation space outer to the vehicle, according to the data.

2. The method of claim 1, wherein the real-life simulation environment comprises a theme park ride.

3. The method of claim 1 further comprising:
outputting the data to a validation process;
logging a validation outcome; and
reporting a validation outcome to the computer application enabling the computer game.

4. The method of claim 1, wherein the simulation space includes video screens bordering the vehicle.

5. The method of claim 1, wherein the simulation space is one of a mountain setting, a jungle setting or an outer space setting.

6. A converter configured to convert a computer game environment of a computer game running on a computer into a real-life simulation environment, the converter comprising:
an input module configured to receive metadata produced by a computer application useable in conjunction with the computer game, the metadata generated in response to an input from a user of the computer game defining virtual features and a virtual layout of the computer game to customize the computer virtual environment for playing on the computer;
a memory including a simulation database containing simulation features of the real-life simulation environment;
a synchronization module configured to match the virtual features of the computer game environment to the simulation features of the real-life simulation environment, the real-life simulation environment including a simulation space and a vehicle designed to move through the simulation space, the simulation space being outer to the vehicle;
a mapping module configured to map the virtual layout of the computer game environment onto the simulation space outer to the vehicle; and
a controller configured to compile the simulation features and results from the mapping module to produce data for the real-life simulation environment corresponding to the computer game environment;
wherein the real-life simulation environment, including the simulation space outer to the vehicle, is configured according to the data.

7. The converter of claim 6, wherein the simulation space is one of a mountain setting, a jungle setting or an outer space setting.

8. The converter of claim 6, wherein the real-life simulation environment comprises a theme park ride.

9. The converter of claim 6, wherein the input module is further configured to receive an outcome of a validation process.

10. The converter of claim 6 further comprising an output module configured to deliver the real-life simulation to a validation process, and wherein the output module is further configured to report an outcome of the validation process.

11. The converter of claim 6, wherein the simulation space includes video screens bordering the vehicle.

12. A system configured to convert a computer game environment of a computer game running on a computer into a real-life simulation environment, the system comprising:
   a converter including:
      an input module configured to receive metadata produced by a computer application useable in conjunction with the computer game, the metadata generated in response to an input from a user of the computer game defining virtual features and a virtual layout of the computer game to customize the computer virtual environment for playing on the computer;
      a memory including a simulation database containing simulation features of the real-life simulation environment;
      a synchronization module configured to match the virtual features of the computer game environment to the simulation features of the real-life simulation environment, the real-life simulation environment including a simulation space and a vehicle designed to move through the simulation space, the simulation space being outer to the vehicle;
      a mapping module configured to map the virtual layout of the computer game environment onto the simulation space outer to the vehicle;
      a controller configured to compile the simulation features and results from the mapping module to produce data for the real-life simulation environment corresponding to the computer game environment, and to configure the real-life simulation environment, including the si,mulation space outer to the vehicle, according to the data;
   at least one entertainment server configured to control and support the real-life simulation environment, the at least one entertainment server configuring the real-life simulation environment, including the simulation space outer to the vehicle, according to the data; and
   a bridge server interfacing the at least one entertainment server with the computer over a packet network.

13. The system of claim 12, wherein the simulation space is one of a mountain setting, a jungle setting or an outer space setting.

14. The system of claim 12, wherein the real-life simulation environment comprises an entertainment attraction.

15. The system of claim 12, wherein the real-life simulation environment comprises a theme park ride.

16. The system of claim 12, wherein the input module is further configured to receive an outcome of a validation process.

17. The system of claim 12 further comprising an output module configured to deliver the real-life simulation to a validation process, wherein the output module is further configured to report an outcome of the validation process.

18. The system of claim 12, wherein the simulation space includes video screens bordering the vehicle.

* * * * *